(12) United States Patent
Su

(10) Patent No.: US 11,142,083 B2
(45) Date of Patent: Oct. 12, 2021

(54) WIRELESS CHARGING SYSTEM, WIRELESS CHARGING STATION, AND VEHICLE

(71) Applicant: SUPER GROUP SEMICONDUCTOR CO., LTD., Hsinchu County (TW)

(72) Inventor: Jen-Jun Su, Hsinchu County (TW)

(73) Assignee: SUPER GROUP SEMICONDUCTOR CO., LTD., Hsinchu County (TW)

( * ) Notice: Subject to any disclaimer, the term of this patent is extended or adjusted under 35 U.S.C. 154(b) by 0 days.

(21) Appl. No.: 16/802,522

(22) Filed: Feb. 26, 2020

(65) Prior Publication Data

US 2020/0298716 A1  Sep. 24, 2020

(30) Foreign Application Priority Data

Mar. 18, 2019 (TW) ................... 108203263

(51) Int. Cl.
*B60L 53/122* (2019.01)
*B60L 53/62* (2019.01)
*B60L 53/31* (2019.01)
*B60L 53/39* (2019.01)

(52) U.S. Cl.
CPC ............ *B60L 53/122* (2019.02); *B60L 53/31* (2019.02); *B60L 53/39* (2019.02); *B60L 53/62* (2019.02)

(58) Field of Classification Search
CPC ........ B60L 53/122; B60L 53/62; B60L 53/31; B60L 53/39; B60L 53/38; B60L 53/12; B60L 53/10; H02J 2310/48; H02J 50/10; H02J 50/90; H02J 50/80; Y02T 90/12; Y02T 10/7072; Y02T 10/70
See application file for complete search history.

(56) References Cited

U.S. PATENT DOCUMENTS

| | | | |
|---|---|---|---|
| 2011/0080051 A1* | 4/2011 | Lee | H02J 50/12 307/104 |
| 2013/0154554 A1* | 6/2013 | Sakai | H02J 50/12 320/108 |
| 2014/0167689 A1* | 6/2014 | Niizuma | H02J 50/12 320/108 |
| 2015/0318709 A1* | 11/2015 | Jol | H02J 50/90 307/104 |
| 2016/0380485 A1* | 12/2016 | Murayama | H02J 7/025 307/104 |
| 2018/0248416 A1* | 8/2018 | Yoshizawa | H02J 50/10 |
| 2018/0269714 A1* | 9/2018 | Samuelsson | H01F 27/2871 |
| 2019/0237271 A1* | 8/2019 | Kim | H01G 11/10 |
| 2020/0169110 A1* | 5/2020 | Yang | H02J 50/40 |

* cited by examiner

*Primary Examiner* — John W Poos
*Assistant Examiner* — Alex W Lam
(74) *Attorney, Agent, or Firm* — CKC & Partners Co., LLC

(57) ABSTRACT

A wireless charging system includes a wireless power receiver, at least one receiver-side magnetic coupling member, a wireless power transmitter and at least one transmitter-side magnetic coupling member. The receiver-side magnetic coupling member is disposed on the wireless power receiver. The transmitter-side magnetic coupling member is disposed on the wireless power transmitter and is configured to attract the receiver-side magnetic coupling member. At least one of the wireless power receiver and the wireless power transmitter is movable.

13 Claims, 13 Drawing Sheets

WIRELESS CHARGING SYSTEM, WIRELESS CHARGING STATION, AND VEHICLE

RELATED APPLICATIONS

This application claims priority to Taiwan Application Serial Number 108203263, filed Mar. 18, 2019, the disclosure of which is incorporated herein by reference in its entirety.

BACKGROUND

Technical Field

The present disclosure relates to a charging system and a charging station and a vehicle utilizing said charging system.

Description of Related Art

Wireless charging overcomes many drawbacks of wired charging and thus has been widely adopted in a variety of electronic devices in recent years. In addition, the industry is actively developing electric vehicles with wireless charging technology. Although wireless charging is quite convenient, it still has its limitations. For example, when the transmitter and the receiver are not aligned, or when the transmitter and the receiver are too far away from each other, wireless charging has poor charging efficiency.

SUMMARY

In view of the foregoing, one of the objects of the present disclosure is to provide a charging system with a transmitter and a receiver that can be automatically aligned.

To achieve the objective stated above, in accordance with an embodiment of the present disclosure, a wireless charging system includes a wireless power receiver, at least one receiver-side magnetic coupling member, a wireless power transmitter and at least one transmitter-side magnetic coupling member. The receiver-side magnetic coupling member is disposed on the wireless power receiver. The transmitter-side magnetic coupling member is disposed on the wireless power transmitter and is configured to attract the receiver-side magnetic coupling member. At least one of the wireless power receiver and the wireless power transmitter is movable.

In one or more embodiments of the present disclosure, the wireless power transmitter is electrically coupled to a power source. The wireless charging system further includes a contact sensor and a switch connected between the wireless power transmitter and the power source. When the contact sensor detects the wireless power transmitter being in contact with the wireless power receiver, the switch allows the power source to deliver electric power to the wireless power transmitter.

In one or more embodiments of the present disclosure, the receiver-side magnetic coupling member includes an electromagnet.

In one or more embodiments of the present disclosure, the wireless power receiver is connected to an energy storage device. The wireless charging system further includes an energy level detector. When the energy level detector detects that an energy level of the energy storage device reaches a predetermined energy level, the electromagnet ceases generating magnetic field.

In accordance with an embodiment of the present disclosure, a wireless charging station includes a base, a wireless power transmitter and at least on magnetic coupling member. The wireless power transmitter is disposed on the base. The magnetic coupling member is disposed on the wireless power transmitter.

In one or more embodiments of the present disclosure, the wireless charging station further includes a plurality of mechanical links. The wireless power transmitter is movably connected to the base via the mechanical links.

In one or more embodiments of the present disclosure, the base has a frame at least partially surrounding the wireless power transmitter. The wireless charging station further includes a plurality of elastic members connected between the frame and the wireless power transmitter.

In accordance with an embodiment of the present disclosure, a vehicle includes a vehicular body, a wireless power receiver and at least one magnetic coupling member. The wireless power receiver is disposed on the vehicular body. The magnetic coupling member is disposed on the wireless power receiver.

In one or more embodiments of the present disclosure, the vehicle further includes a movement mechanism connected between the vehicular body and the wireless power receiver. The movement mechanism is configured to move the wireless power receiver between a charging position and a standby position.

In one or more embodiments of the present disclosure, the wireless power receiver is located on a roof of the vehicular body.

In one or more embodiments of the present disclosure, the wireless power receiver is located on a side surface of the vehicular body.

In one or more embodiments of the present disclosure, the wireless power receiver is located on a hood of the vehicular body.

In one or more embodiments of the present disclosure, the wireless power receiver is located on a trunk lid of the vehicular body.

In accordance with an embodiment of the present disclosure, a wireless charging station includes a movable base, a wireless power transmitter and a positioning device. The wireless power transmitter is disposed on the movable base. The positioning device is disposed on the movable base and is configured to detect the wireless power receiver. The wireless power receiver is detected by the positioning device, the positioning device controls the movable base to move the wireless power transmitter, to have the wireless power transmitter abut the wireless power receiver to perform wireless charging.

In sum, the wireless charging system of the present disclosure is featured with magnetic coupling members on both the wireless power receiver and the wireless power transmitter. The wireless power receiver and the wireless power transmitter may be aligned under the guidance of the attractive magnetic force produced by the magnetic coupling members, thereby improving charging efficiency.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

DETAILED DESCRIPTION

Figure 1:
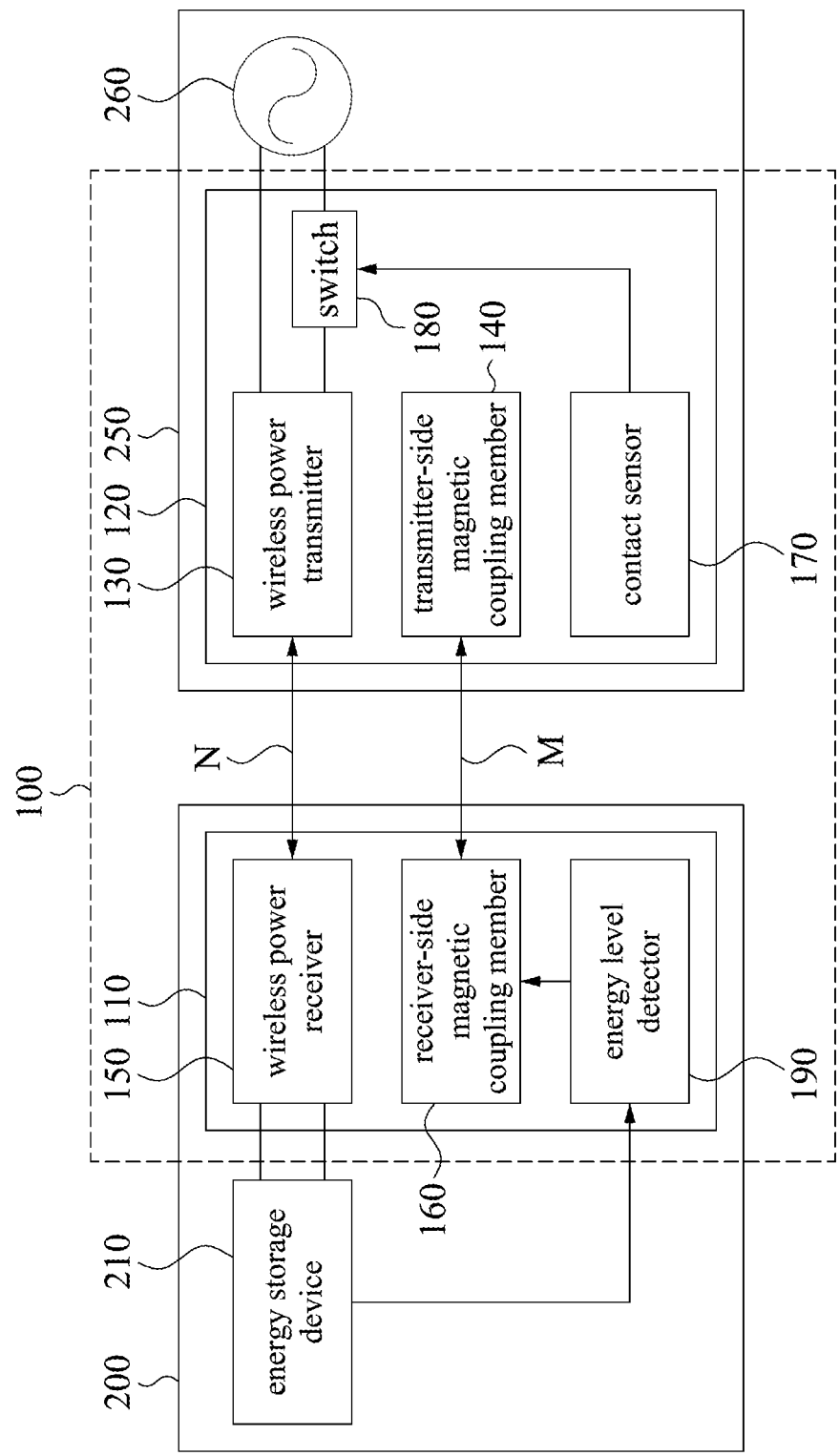
FIG. 1 illustrates a block diagram of a vehicle, a wireless charging station configured to charge the vehicle, and a wireless charging system installed on the wireless charging station and the vehicle in accordance with an embodiment of the present disclosure.

For the sake of the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Figure 2:
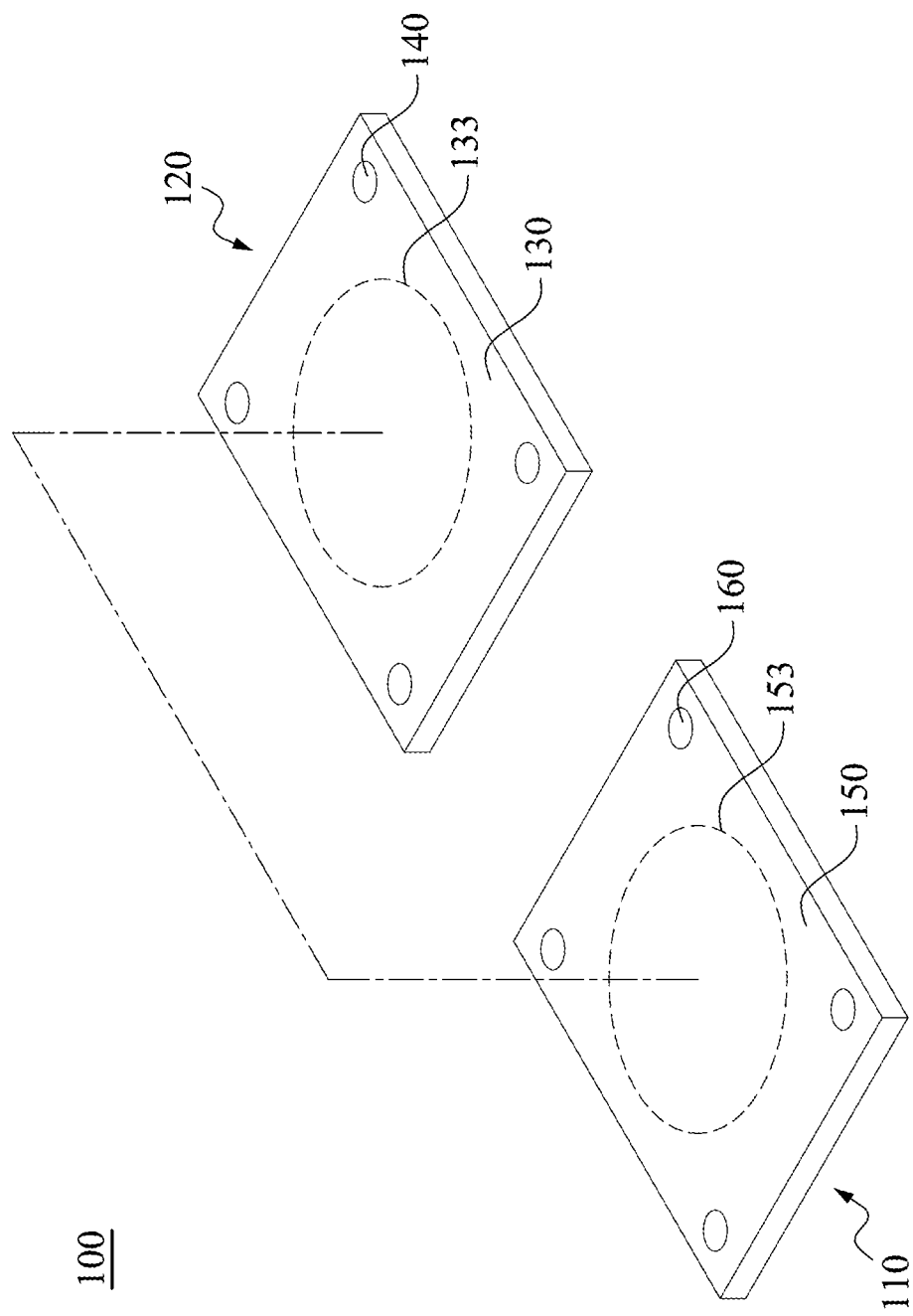
FIG. 2 illustrates an exploded view of the wireless charging system shown in FIG. 1.

Reference is made to FIGS. 1 and 2. FIG. 1 illustrates a block diagram of a vehicle 200, a wireless charging station 250 configured to charge the vehicle 200, and a wireless charging system 100 installed on the wireless charging station 250 and the vehicle 200 in accordance with an embodiment of the present disclosure. FIG. 2 illustrates an exploded view of the wireless charging system 100 shown in FIG. 1. The wireless charging system 100 includes a receiver-side subsystem 110 and a transmitter-side subsystem 120. The transmitter-side subsystem 120 is installed on the wireless charging station 250 and includes a wireless power transmitter 130 and a plurality of transmitter-side magnetic coupling members 140. The wireless power transmitter 130 is electrically coupled to a power source 260 of the wireless charging station 250. The transmitter-side magnetic coupling members 140 are disposed on the wireless power transmitter 130 (see FIG. 2). As shown in FIG. 2, the wireless power transmitter 130 includes a power transmitting coil 133 (which is disposed in the interior of the wireless power transmitter 130 and is thus shown in dashed lines) and other electronic components, such as control circuits, for implementing the wireless charging function (not depicted). The transmitter-side magnetic coupling members 140 are arranged around the power transmitting coil 133.

As shown in FIGS. 1 and 2, the receiver-side subsystem 110 is installed on a vehicular body 220 of the vehicle 200 (see FIG. 3) and includes a wireless power receiver 150 and a plurality of receiver-side magnetic coupling members 160. The wireless power receiver 150 is electrically coupled to an energy storage device 210 of the vehicle 200. The receiver-side magnetic coupling members 160 are disposed on the wireless power receiver 150 (see FIG. 2). As shown in FIG. 2, the wireless power receiver 150 includes a power receiving coil 153 (which is disposed in the interior of the wireless power receiver 150 and is thus shown in dashed lines) and other electronic components, such as control circuits, for implementing the wireless charging function (not depicted). The receiver-side magnetic coupling members 160 are arranged around the power receiving coil 153. As shown in FIG. 1, the wireless power transmitter 130 induces current on the wireless power receiver 150 by electromagnetic induction N. The induced current flows to the energy storage device 210 to charge the same. The transmitter-side magnetic coupling members 140 are configured to attract the receiver-side magnetic coupling members 160. Under the guidance of an attractive magnetic force M between the transmitter-side magnetic coupling members 140 and the receiver-side magnetic coupling members 160, the wireless power receiver 150 may properly align with the wireless power transmitter 130 (more precisely, the power receiving coil 153 of the wireless power receiver 150 may properly align with the power transmitting coil 133 of the wireless power transmitter 130), thereby improving charging efficiency. Furthermore, at least one of the wireless power receiver 150 and the wireless power transmitter 130 is movable (will be discussed in detail below with reference to FIGS. 3 to 10). Therefore, when the parking position of the vehicle 200 is slightly off, under the guidance of the attractive magnetic force M, at least one of the wireless power receiver 150 and the wireless power transmitter 130 may slightly shift its position, such that the wireless power receiver 150 and the wireless power transmitter 130 may be aligned.

In some embodiments, as shown in FIG. 2, the transmitter-side magnetic coupling members 140 are exposed on a surface of the wireless power transmitter 130, and the receiver-side magnetic coupling members 160 are exposed on a surface of the wireless power receiver 150. The transmitter-side magnetic coupling members 140 are configured to attract and be attached by the receiver-side magnetic coupling members 160, to have the wireless power receiver 150 abut the wireless power transmitter 130. The structural configuration described above is merely an example. The present disclosure is not limited thereto. In some embodiments, the transmitter-side magnetic coupling members 140 and the receiver-side magnetic coupling members 160 are embedded in the wireless power transmitter 130 and the wireless power receiver 150 respectively. In some embodiments, the wireless power transmitter 130 and the wireless power receiver 150 are aligned under the guidance of the attractive magnetic force M, but do not make contact with each other.

In some embodiments, as shown in FIG. 1, the transmitter-side subsystem 120 further includes a contact sensor 170 and a switch 180 connected between the wireless power transmitter 130 and the power source 260. The switch 180 is configured to switch between two states, closed circuit and open circuit, based on the measurement of the contact sensor 170. The contact sensor 170 may include piezoelectric sensor, Hall effect sensor, other suitable sensors or any combination thereof.

Following the discussion in the previous paragraph, when the contact sensor 170 detects the wireless power transmitter 130 being in contact with the wireless power receiver 150, the switch 180 forms a closed circuit to allow the power source 260 to deliver electric power to the wireless power transmitter 130. On the other hand, when the contact sensor 170 does not detect the wireless power transmitter 130 being in contact with the wireless power receiver 150, the switch 180 forms an open circuit to stop the power source 260 from delivering electric power to the wireless power transmitter 130. In other words, the charging process starts only when the wireless power receiver 150 is in position (i.e., when the wireless power receiver 150 abuts the wireless power transmitter 130).

In some embodiments, as shown in FIG. 1, the receiver-side subsystem 110 further includes an energy level detector 190 configured to measure an energy level of the energy storage device 210 of the vehicle 200. The receiver-side magnetic coupling members 160 include electromagnet(s). The transmitter-side magnetic coupling members 140 may include permanent magnet(s), electromagnet(s) or ferromagnetic material(s). When the energy level detector 190 detects that the energy level of the energy storage device 210 reaches a predetermined energy level, the receiver-side subsystem 110 determines that the charging process for the energy storage device 210 is completed, and the electromagnet (i.e., the receiver-side magnetic coupling members 160) ceases generating magnetic field to allow the vehicle 200 to leave the wireless charging station 250 without being obstructed by the attractive magnetic force M.

In some embodiments, the electromagnet (i.e., the receiver-side magnetic coupling members 160) is electrically coupled to the energy storage device 210 of the vehicle 200 via a switch (not depicted). When the energy level detector 190 detects that the energy level of the energy storage device 210 is below the predetermined energy level, the switch connected between the electromagnet and the energy storage device 210 forms a closed circuit. Therefore, the energy storage device 210 may deliver electric power to the electromagnet to keep the electromagnet and the transmitter-side magnetic coupling members 140 firmly attached. On the other hand, when the energy level detector 190 detects that the energy level of the energy storage device 210 reaches the predetermined energy level, the switch connected between the electromagnet and the energy storage device 210 forms an open circuit. Therefore, the energy storage device 210 does not deliver electric power to the electromagnet, and the electromagnet and the transmitter-side magnetic coupling members 140 are no longer attracted to each other. In some embodiments, the receiver-side subsystem 110 further includes a dedicated battery for powering the electromagnet (not depicted).

Figure 3:
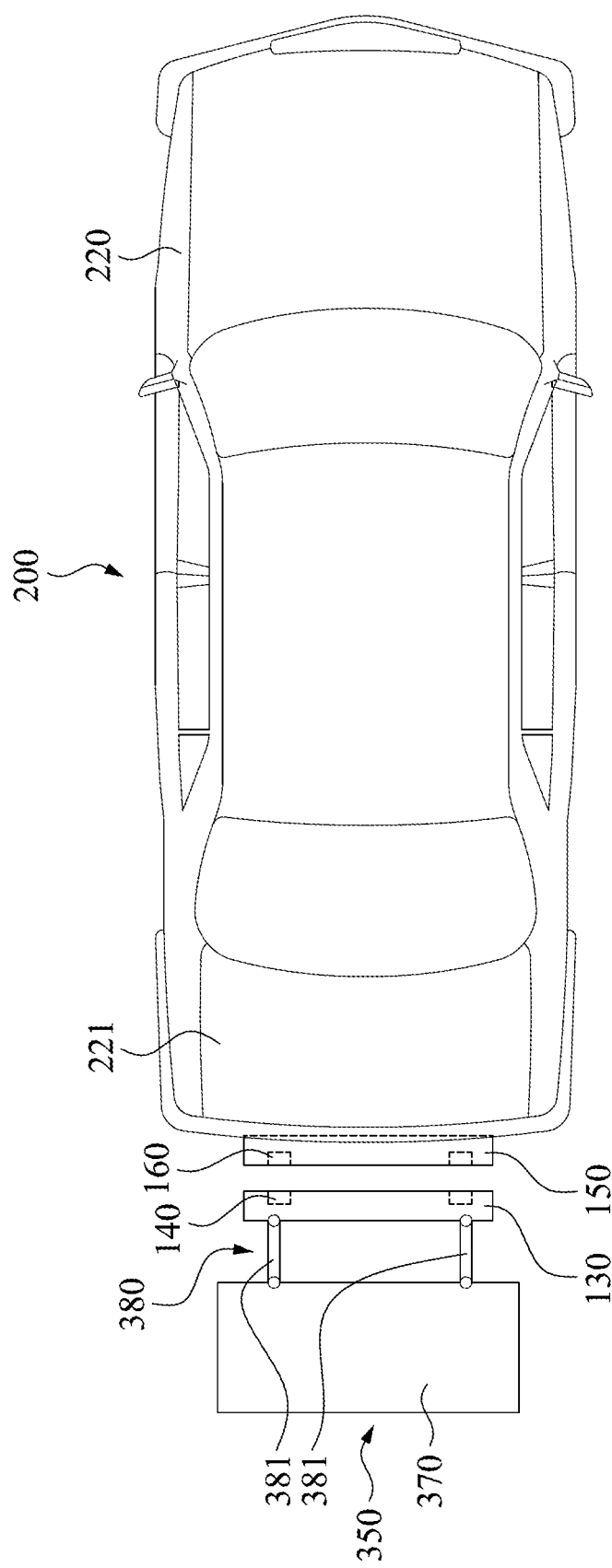
FIG. 3 illustrates a schematic top view of a vehicle and a wireless charging station in accordance with another embodiment of the present disclosure.

Reference is made to FIG. 3, which illustrates a schematic top view of a vehicle 200 and a wireless charging station 350 in accordance with another embodiment of the present disclosure. In the present embodiment, the wireless power receiver 150 is disposed on a trunk lid 221 of the vehicular body 220. Accordingly, the vehicle 200 has to approach the wireless charging station 350 with the trunk lid 221 facing the wireless charging station 350. The wireless power receiver 150 may be embedded in the trunk lid 221, or alternatively be fixed on the exterior of the trunk lid 221. The present disclosure is however not limited thereto.

In the present embodiment, as shown in FIG. 3, the wireless charging station 350 further includes a base 370 and a movement mechanism 380. The movement mechanism 380 is connected between the wireless power transmitter 130 and the base 370, such that the wireless power transmitter 130 is movably disposed on the base 370.

In some embodiments, as shown in FIG. 3, the movement mechanism 380 includes a plurality of mechanical links 381. The wireless power transmitter 130 is movably connected to the base 370 via the mechanical links 381. Each of the mechanical links 381 has two opposite ends that are pivotably connected to the base 370 and the wireless power transmitter 130 respectively. The wireless power transmitter 130 can thus move slightly forward, backward, left and right with respect to the base 370 as the mechanical links 381 are rotated. Even if the parking position of the vehicle 200 is slightly off, by virtue of the movable wireless power transmitter 130, as well as the attractive magnetic force M produced by the transmitter-side magnetic coupling members 140 and the receiver-side magnetic coupling members 160, the wireless power receiver 150 on the vehicle 200 can still align with the wireless power transmitter 130 on the wireless charging station 350.

Figure 3A:
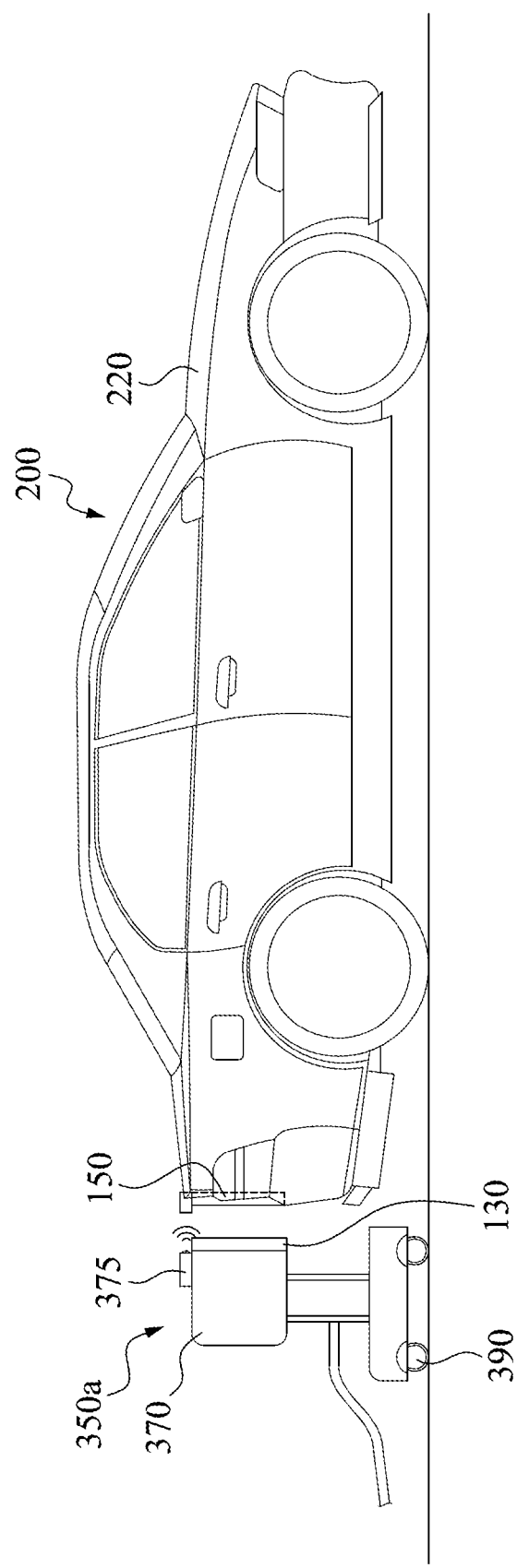
FIG. 3A illustrates a schematic side view of a vehicle and a wireless charging station in accordance with another embodiment of the present disclosure.

In some embodiments, as shown in FIG. 3A, the wireless charging station 350a includes a base 370, a wireless power transmitter 130 and a positioning device 375. The base 370 may be disposed on a wheel-equipped carrier 390 for moving. The wireless power transmitter 130 is connected to the base 370. The positioning device 375 may detect the wireless power receiver 150 on the vehicle 200 by means of wireless communication signals between the wireless charging station 350a and the vehicle 200, or image-based positioning. When the wireless power receiver 150 is detected by the positioning device 375, the positioning device 375 controls the moving direction of the wheel-equipped carrier 390 to move the wireless power transmitter 130, to have the wireless power transmitter 130 abut the wireless power receiver 150. As a result, the wireless power receiver 150 on the vehicle 200 can align with the wireless power transmitter 130 on the wireless charging station 350a to perform wireless charging.

Figure 4:
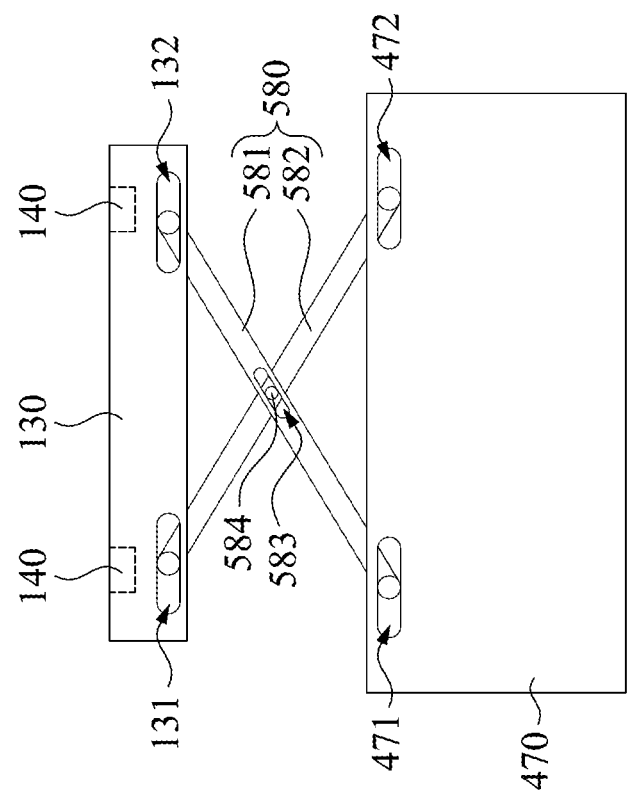
FIG. 4 illustrates a schematic top view of a wireless charging station in accordance with another embodiment of the present disclosure.

Reference is made to FIG. 4, which illustrates a schematic top view of a wireless charging station 450 in accordance with another embodiment of the present disclosure. The present embodiment differs from the embodiment shown in FIG. 3 in that the movement mechanism 480 includes a first link 481 and a second link 482 pivotably connected to each other. The base 470 has two slots 471 and 472. The wireless power transmitter 130 also has two slots 131 and 132. The two ends of the first link 481 are slidably and rotatably connected to the slots 471 and 132 respectively, whereas the two ends of the second link 482 are slidably and rotatably connected to the slots 472 and 131 respectively. The first link 481 and the second link 482 are pivotably connected to each other at their intersection. By this arrangement, the wireless power transmitter 130 may have two degrees of freedom of motion (i.e., the wireless transmitter 130 may move forward, backward, left and right with respect to the base 470).

It should be noted that, in practice, the wireless power transmitter 130 and the base 470 may alternatively each include a single slot. Specifically, the slot 131 of the wireless power transmitter 130 may be replaced with a pivot, and the second link 482 is connected to the pivot on the wireless power transmitter 130. The slot 471 of the base 470 may be replaced with a pivot, and the first link 481 is connected to the pivot on the base 470. By this arrangement, the wireless power transmitter 130 may move forward or backward with respect to the base 470.

Figure 5:
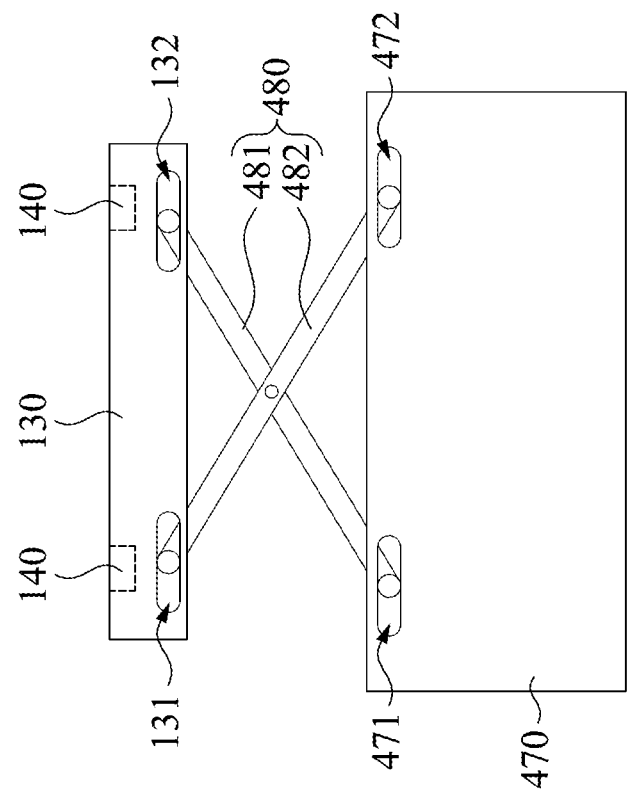
FIG. 5 illustrates a schematic top view of a wireless charging station in accordance with another embodiment of the present disclosure.

Reference is made to FIG. 5, which illustrates a schematic top view of a wireless charging station 550 in accordance with another embodiment of the present disclosure. In the present embodiment differs from the embodiment shown in FIG. 4 in that the movement mechanism 580 includes a first link 581 with a slot 583, and a second link 582 with a slider 584. The slider 584 is slidably and rotatably connected to the slot 583. By this arrangement, the wireless power transmitter 130 can not only translate but also rotate slightly.

Figure 6:
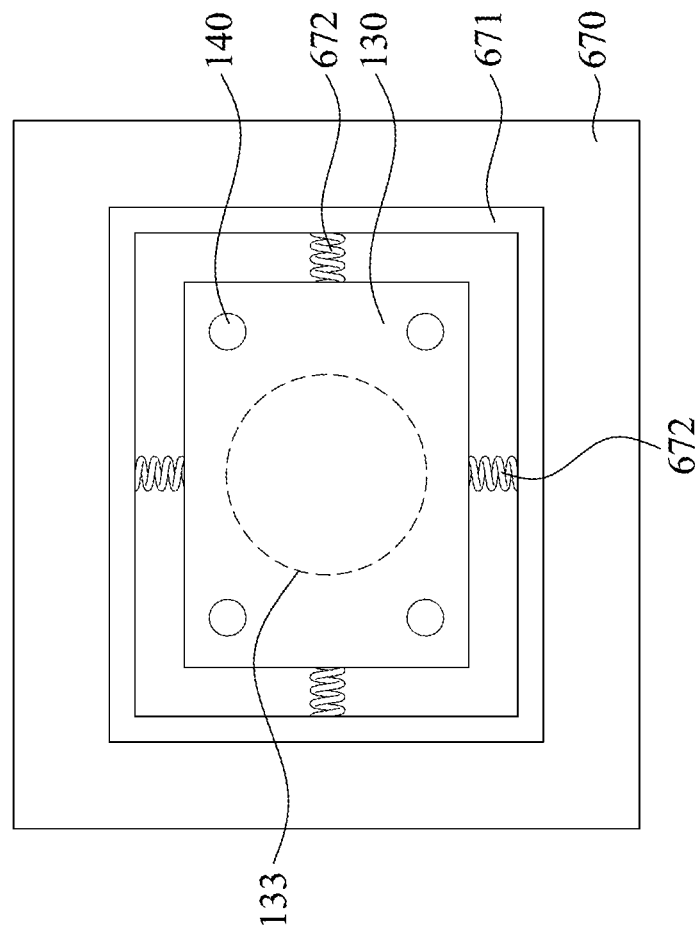
FIG. 6 illustrates a schematic front view of a wireless charging station in accordance with another embodiment of the present disclosure.

Reference is made to FIG. 6, which illustrates a schematic front view of a wireless charging station 650 in accordance with another embodiment of the present disclosure. The present embodiment differs from the embodiment shown in FIGS. 3 to 5 in that the wireless power transmitter 130 on the wireless charging station 650 is made movable using elastic members. Specifically, the base 670 of the wireless charging station 650 has a frame 671 at least partially surrounding the wireless power transmitter 130. A plurality of elastic members 672 (e.g., tension springs) are connected between the frame 671 and the wireless power transmitter 130. In some embodiments, some of the elastic members 672 extend along a first direction (e.g., in FIG. 6. the two elastic members 672 positioned on the left and the right of the wireless power transmitter 130 extend along a horizontal direction), and some of the elastic members 672 extend along a second direction not in parallel with the first direction (e.g., in FIG. 6, the two elastic members 672 positioned above and below the wireless power transmitter 130 extend along a vertical direction).

It should be noted that movement mechanisms shown in FIGS. 3 to 6 are examples only. The present disclosure is not limited thereto. The skilled person may adopt any means/mechanisms to make the wireless power transmitter 130 movable on the wireless charging station based on application requirements, provided the wireless power transmitter 130 can have certain freedom of motion to be able to align with the wireless power receiver 150 on the vehicle 200.

Figure 7A:
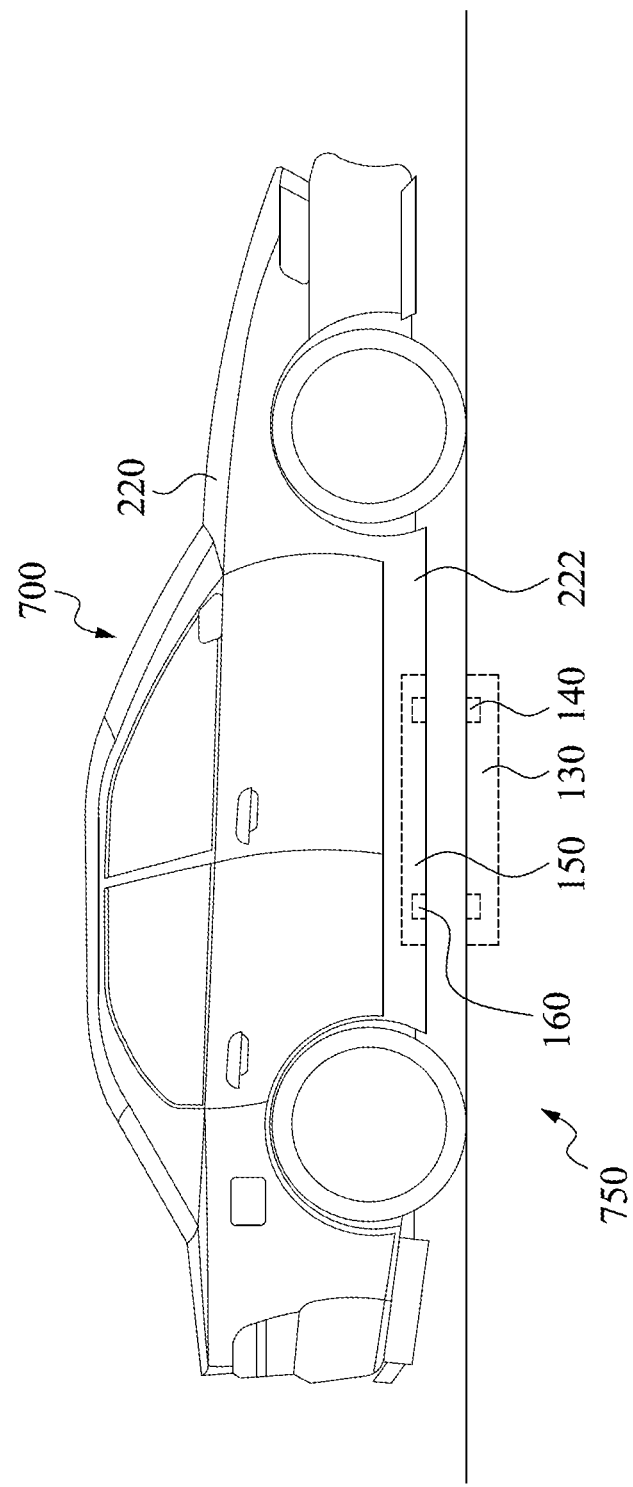
FIG. 7A illustrates a schematic side view of a vehicle and a wireless charging station in a state in accordance with another embodiment of the present disclosure.
Figure 7B:
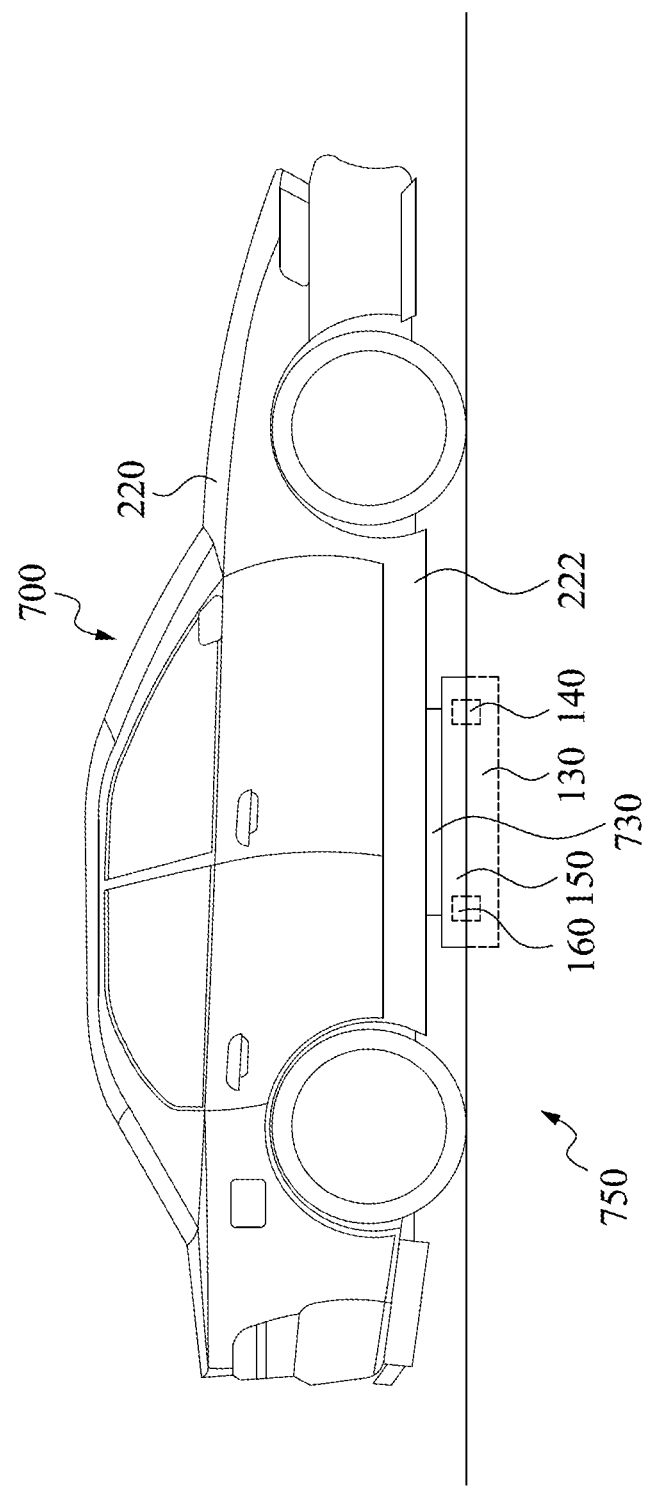
FIG. 7B illustrates a schematic side view of the vehicle and the wireless charging station shown in FIG. 7A in another state.

Reference is made to FIGS. 7A and 7B, which illustrate schematic side views of a vehicle 700 and a wireless charging station 750 in two different states in accordance with another embodiment of the present disclosure. The present embodiment differs from the embodiments described above in that the wireless power transmitter 130 on the wireless charging station 750 is stationary, and the vehicle 700 further includes a movement mechanism 730 (see FIG. 7B) connected between the vehicular body 220 and the wireless power receiver 150. The movement mechanism 730 is configured to move the wireless power receiver 150 between a charging position (i.e., the position of the wireless power receiver 150 shown in FIG. 7B) and a standby position (i.e., the position of the wireless power receiver 150 shown in FIG. 7A).

Specifically, in the present embodiment, as shown in FIGS. 7A and 7B, the wireless power transmitter 130 of the wireless charging station 750 is fixed on the ground. As shown in FIG. 7B, when the vehicle 700 enters the wireless charging station 750 for charging, the wireless power receiver 150 moves downward to the charging position as driven by the movement mechanism 730. The wireless power receiver 150 at the charging position protrudes outwardly from a chassis 222 of the vehicular body 220 and abuts the wireless power transmitter 130 (or approaching the wireless power transmitter 130 without contacting the wireless power transmitter 130). As shown in FIG. 7A, after the charging process has completed, the wireless power receiver 150 moves upward to the standby position as driven by the movement mechanism 730. The wireless power receiver 150 at the standby position retracts into the vehicular body 220 to avoid collision during driving.

The movement mechanism 730 may be any suitable mechanical structure capable of moving objects. FIG. 7B only schematically depicts the movement mechanism 730 without showing its structure in detail. For example, the movement mechanism 730 of the vehicle 700 may include mechanical links pivotably connected to the wireless power receiver 150 and the vehicular body 220 (e.g., similar to the movement mechanisms 480 and 580 shown in FIGS. 4 and 5) and a driving device to drive the mechanical links to rotate. The rotation of the mechanical links may bring the wireless power receiver 150 upward and downward. In addition, the mechanical links may be slidably connected to a slot on the wireless power receiver 150 to enable the wireless power receiver 150 to freely move left and right. Furthermore, in some embodiments, the movement mechanism 730 of the vehicle 700 may include at least one cable and a motor to drive the cable. The cable serves to hang the wireless power receiver 150 and to allow the wireless power receiver 150 to make small movements on the horizontal plane.

Figure 7C:
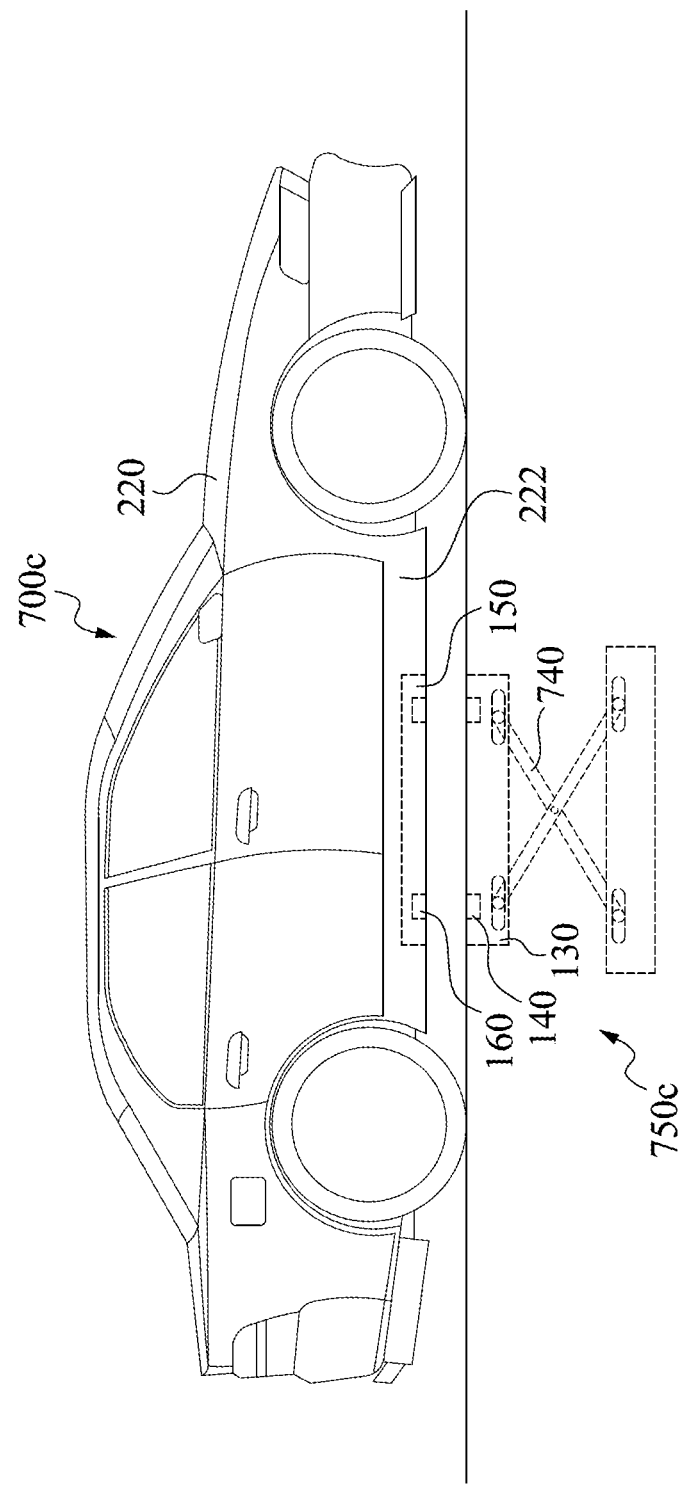
FIG. 7C illustrates a schematic side view of a vehicle and a wireless charging station in a state in accordance with another embodiment of the present disclosure.
Figure 7D:
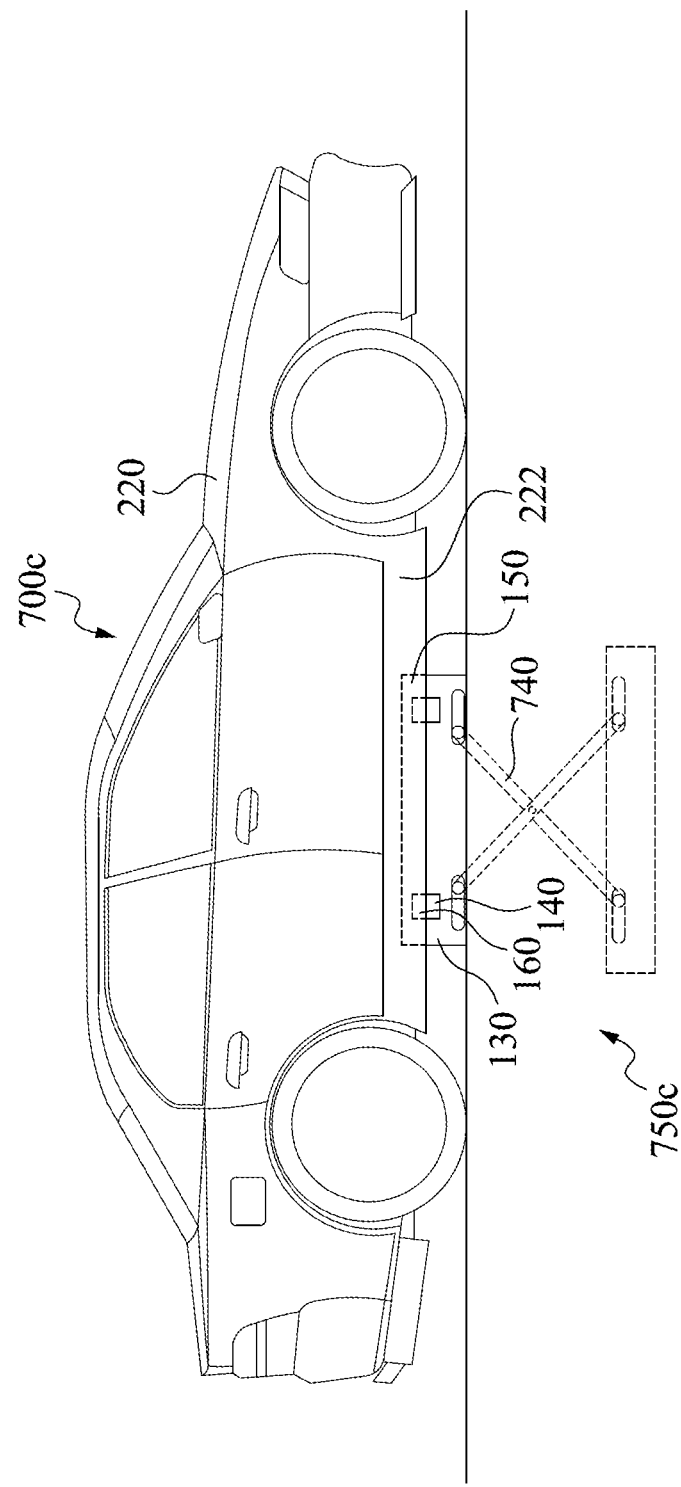
FIG. 7D illustrates a schematic side view of the vehicle and the wireless charging station shown in FIG. 7C in another state.

Reference is made to FIGS. 7C and 7D, which illustrate schematic side views of a vehicle 700c and a wireless charging station 750c in two different states in accordance with another embodiment of the present disclosure. In the present embodiment, the wireless charging station 750c is hidden under the ground when left standby. When the vehicle 700c is in position for charging, the wireless power transmitter 130 is elevated by the movement mechanism 740 to approach/contact the wireless power receiver 150 at the bottom of the vehicle 700c to perform wireless charging.

Figure 8:
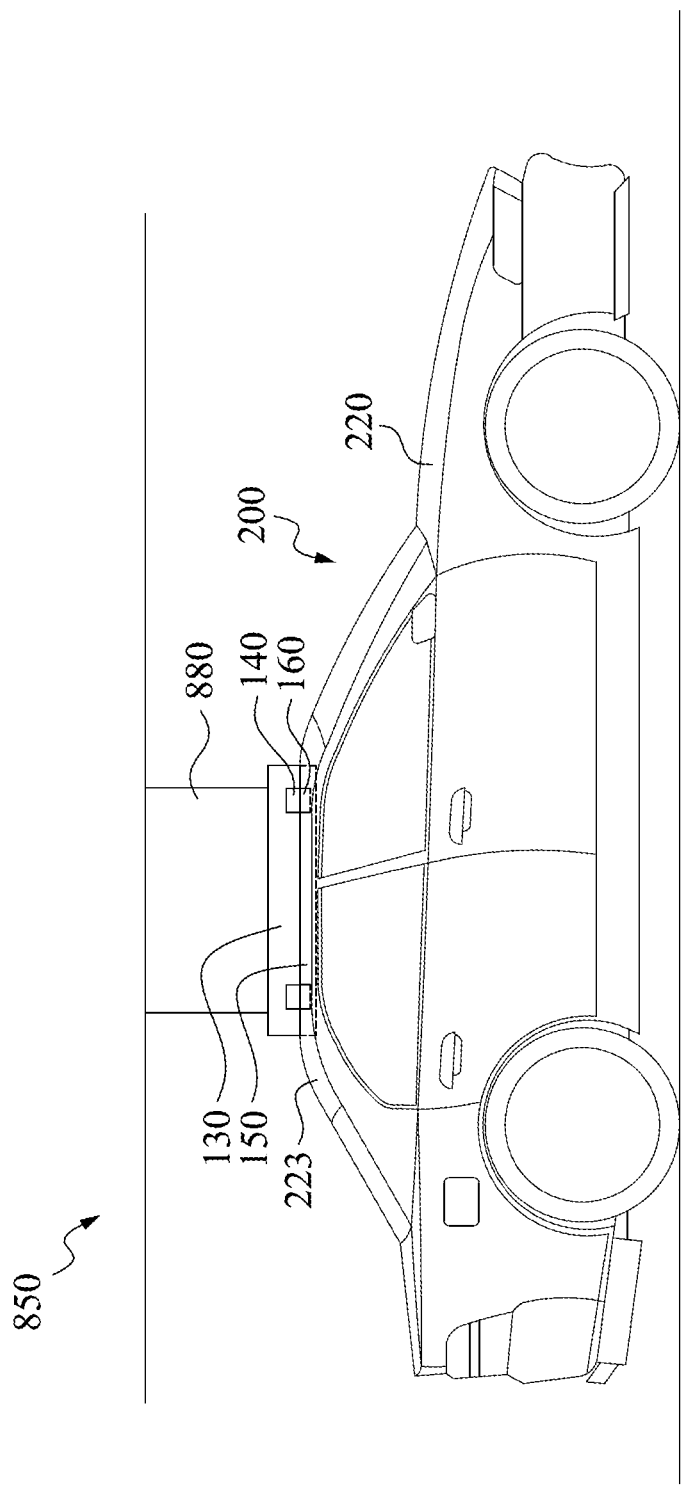
FIG. 8 illustrates a schematic side view of a vehicle and a wireless charging station in accordance with another embodiment of the present disclosure.
Figure 9:
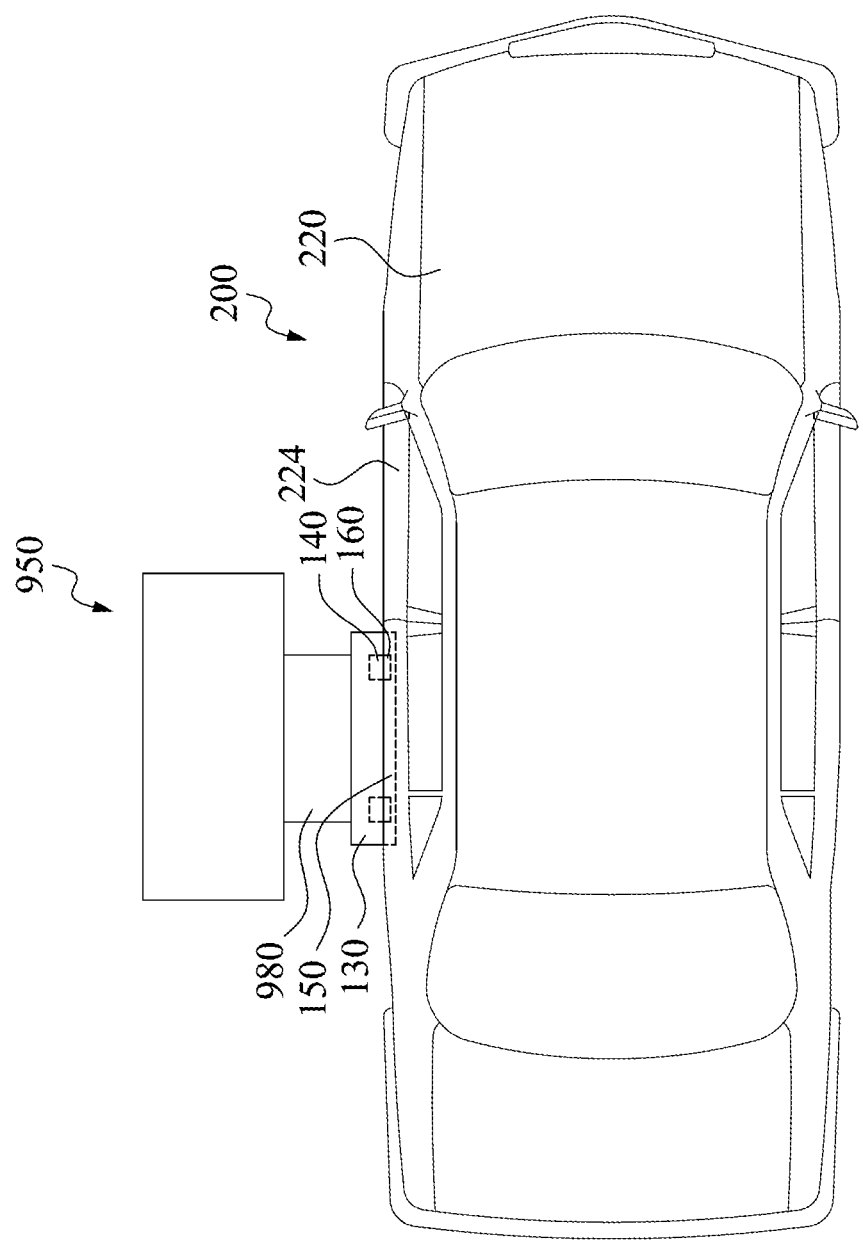
FIG. 9 illustrates a schematic top view of a vehicle and a wireless charging station in accordance with another embodiment of the present disclosure.
Figure 10:
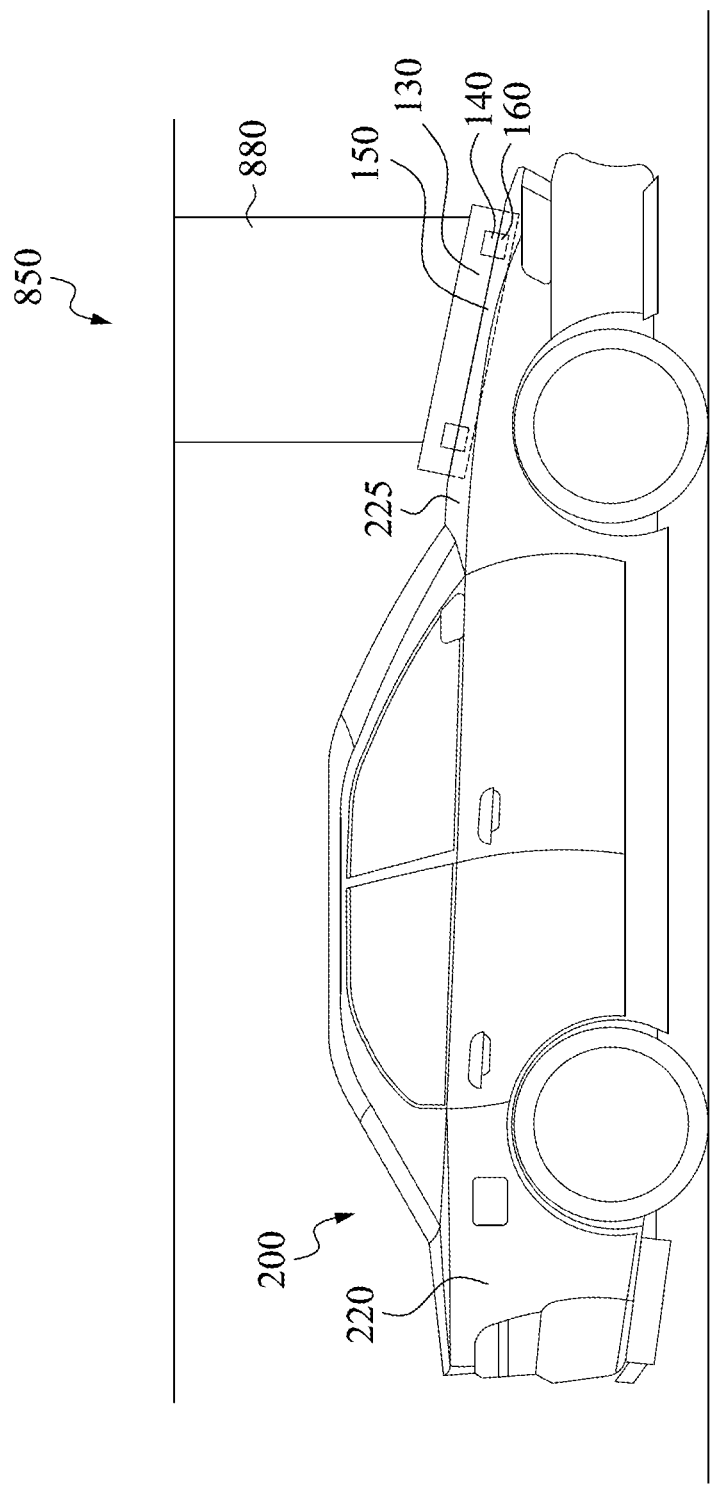
FIG. 10 illustrates a schematic side view of a vehicle and a wireless charging station in accordance with another embodiment of the present disclosure.

It should be noted that the wireless power receiver 150 may be disposed at any suitable positions on the vehicular body 220. As shown in FIG. 3, the wireless power receiver 150 may be disposed on the trunk lid 221 of the vehicular body 220. As shown in FIG. 7A, the wireless power receiver 150 may be disposed on the chassis 222 of the vehicular body 220. As shown in FIG. 8, the wireless power receiver 150 may be disposed on a roof 223 of the vehicular body 220. The wireless power transmitter 130 of the wireless charging station 850 descends and abuts the wireless power receiver 150 (or approaching the wireless power receiver 150 without contacting the wireless power receiver 150) as driven by the movement mechanism 880, to charge the vehicle 200. As shown in FIG. 9, the wireless power receiver 150 may be disposed on a side surface 224 of the vehicular body 220. The wireless power transmitter 130 of the wireless charging station 950 moves towards the vehicle 200 and abuts the wireless power receiver 150 (or approaching the wireless power receiver 150 without contacting the wireless power receiver 150) as driven by the movement mechanism 980, to charge the vehicle 200. As shown in FIG. 10, the wireless power receiver 150 may be disposed on a hood 225 of the vehicular body 220. The wireless power transmitter 130 of the wireless charging station 850 descends and abuts the wireless power receiver 150 (or approaching the wireless power receiver 150 without contacting the wireless power receiver 150) as driven by the movement mechanism 880, to charge the vehicle 200.

In sum, the wireless charging system of the present disclosure is featured with magnetic coupling members on both the wireless power receiver and the wireless power transmitter. The wireless power receiver and the wireless power transmitter may be aligned under the guidance of the attractive magnetic force produced by the magnetic coupling members, thereby improving charging efficiency.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A wireless charging system, comprising:
   a wireless power receiver comprising a power receiving coil;
   at least one receiver-side magnetic coupling member disposed on the wireless power receiver, wherein the at least one receiver-side magnetic coupling member is arranged around the power receiving coil and is spaced apart from the power receiving coil;
   a wireless power transmitter comprising a power transmitting coil; and
   at least one transmitter-side magnetic coupling member stationarily disposed on the wireless power transmitter and configured to attract the at least one receiver-side magnetic coupling member, wherein the at least one transmitter-side magnetic coupling member is arranged around the power transmitting coil and is spaced apart from the power transmitting coil;
   wherein at least one of the wireless power receiver and the wireless power transmitter is movable, wherein the wireless power transmitter is electrically coupled to a power source, the wireless charging system further comprises a contact sensor and a switch, the switch is connected between the wireless power transmitter and the power source, when the contact sensor detects the wireless power transmitter being in contact with the wireless power receiver, the switch allows the power source to deliver electric power to the wireless power transmitter.

2. The wireless charging system of claim 1, wherein the at least one receiver-side magnetic coupling member comprises an electromagnet.

3. The wireless charging system of claim 2, wherein the wireless power receiver is connected to an energy storage device, the wireless charging system further comprises an energy level detector, when the energy level detector detects that an energy level of the energy storage device reaches a predetermined energy level, the electromagnet ceases generating magnetic field.

4. A wireless charging station, comprising:
   a base;
   a wireless power transmitter disposed on the base and comprising a power transmitting coil; and
   at least one magnetic coupling member stationarily disposed on the wireless power transmitter, wherein the at least one magnetic coupling member is arranged around the power transmitting coil and is spaced apart from the power transmitting coil;
   wherein the wireless power transmitter is electrically coupled to a power source, the wireless charging station further comprises a contact sensor and a switch, the switch is connected between the wireless power transmitter and the power source, when the contact sensor detects the wireless power transmitter being in contact with a wireless power receiver, the switch allows the power source to deliver electric power to the wireless power transmitter.

5. The wireless charging station of claim 4, further comprising a plurality of mechanical links, wherein the wireless power transmitter is movably connected to the base via the mechanical links.

6. The wireless charging station of claim 4, wherein the base has a frame at least partially surrounding the wireless power transmitter, the wireless charging station further comprises a plurality of elastic members connected between the frame and the wireless power transmitter.

7. A vehicle, comprising:
   a vehicular body;
   a wireless power receiver disposed on the vehicular body and comprising a power receiving coil; and
   at least one magnetic coupling member disposed on the wireless power receiver, wherein the at least one magnetic coupling member is arranged around the power receiving coil and is spaced apart from the power receiving coil;
   wherein the at least one magnetic coupling member comprises an electromagnet, wherein the wireless power receiver is connected to an energy storage device, the vehicle further comprises an energy level detector, when the energy level detector detects that an energy level of the energy storage device reaches a predetermined energy level, the electromagnet ceases generating magnetic field.

8. The vehicle of claim 7, further comprising a movement mechanism connected between the vehicular body and the wireless power receiver, the movement mechanism being configured to move the wireless power receiver between a charging position and a standby position.

9. The vehicle of claim 7, wherein the wireless power receiver is located on a roof of the vehicular body.

10. The vehicle of claim 7, wherein the wireless power receiver is located on a side surface of the vehicular body.

11. The vehicle of claim 7, wherein the wireless power receiver is located on a hood of the vehicular body.

12. The vehicle of claim 7, wherein the wireless power receiver is located on a trunk lid of the vehicular body.

13. A wireless charging station for charging a vehicle having a wireless power receiver, the wireless charging station comprising:
   a base disposed on a wheel-equipped carrier;
   a wireless power transmitter disposed on the base; and
   a positioning device disposed on the base and configured to detect the wireless power receiver, wherein when the wireless power receiver is detected by the positioning device, the positioning device controls a moving direction of the wheel-equipped carrier to have the wireless power transmitter abut against and align with the wireless power receiver to perform wireless charging.

* * * * *